March 12, 1935.  K. KARNATH  1,993,844

DEVICE FOR RESURFACING OR GRINDING PARALLEL SURFACES

Original Filed July 21, 1928

Inventor
Kurt Karnath
By Foster + Colier
Attorneys

Patented Mar. 12, 1935

1,993,844

UNITED STATES PATENT OFFICE 1,993,844

DEVICE FOR RESURFACING OR GRINDING PARALLEL SURFACES

Kurt Karnath, Zweibrucken, Germany

Original application July 21, 1928, Serial No. 294,502. Divided and this application May 2, 1930, Serial No. 449,239. In Belgium July 20, 1928

2 Claims. (Cl. 51—205)

The present application is a division of my co-pending application Serial No. 294,502, filed July 21, 1928.

The present invention relates to a device for resurfacing or grinding parallel surfaces. It is of particular value in valve seating and grinding due to the fact that the valve seat may be ground in situ and without removing any section or sections of the valve and pipe connection.

In my copending application Serial No. 294,502 I have fully described a method of joining the pipe sections immediately adjoining the valve proper. This result is accomplished without necessitating a flange joint as explained hereinafter.

It is a well known fact that a more satisfactory joint between pipe sections is obtained when they are welded together than when they are connected by a flange joint. The reason for this is that the flange joint requires a packing material which in the case of steam pipes soon becomes warped and misshapen. As a necessary consequence of this warping steam escapes at the joint and it is then necessary to re-pack it.

On the other hand it is not practical to butt weld sections of piping of different material because there is imminent danger of setting up internal strains in the material which may cause a "failure" at or near the welded joint. Moreover, the valve casing is very often of such dimensions as not to permit use of a centering device which is necessary in the welding operation.

In carrying this feature of my invention into effect I first electrically weld a comparatively short piece of pipe, the latter being immediately adjacent the valve, to the pipe line. Then, I screw over the end of the shorter piece of pipe, the valve casing and seal this joint by welding.

In carrying the main object of this invention into effect, I provide a novel abrading machine which may be inserted into the valve casing, the construction of this machine involving a centering mechanism, grinding and cutting disks and a ratchet means for its operation.

Referring to the drawing, Figure 1 shows the novel tool in operative position in a valve casing, 1 being a connecting branch of valve casing 2, and members 3 and 5 the parallel surfaces to be ground. In order to observe the method of assembling the tool, reference is had to Figure 2.

In Figure 2, it can be seen that the abrading tool consists of the abrading disk 7, having a centering means 13 adapted to be inserted in the valve casing as shown in Figure 1. In assembling the tool, the spindle 16 secured to member 7 is inserted in the ratchet wheel 11 so that the screw threaded well 18 of ratchet wheel 11 is in registry with screw threaded well 19 of spindle 16, whereupon screw 17 is inserted to secure the spindle to the ratchet wheel.

The outer end of spindle 16 is of reduced diameter as shown at 5 and when the tool is assembled the said reduced end 5 is disposed in a recess in the boss member 8, the spindle 16 being secured to boss member 8 by bolt 15. The knife carrier 12 is provided with a centering means 20, similar to 13 as above. The boss 8 and member 12 are made integral by virtue of the recesses 21 and 23 into which a pin 22 may be inserted. By turning nut 9, the lateral or axial position of knives 6 may be adjusted. The member 29, integral with fork handle 10, engages ratchet wheel 11 in operative position, and movement of the handle 10 causes rotation of the members 7 and 12. In Figure 3 a side view of the knife carrying assembly is shown, while Figure 4 is a front view of the same assembly. The knives 6 are secured to 12 by wedge shaped bolts 25 carrying nuts 26.

Figure 1:
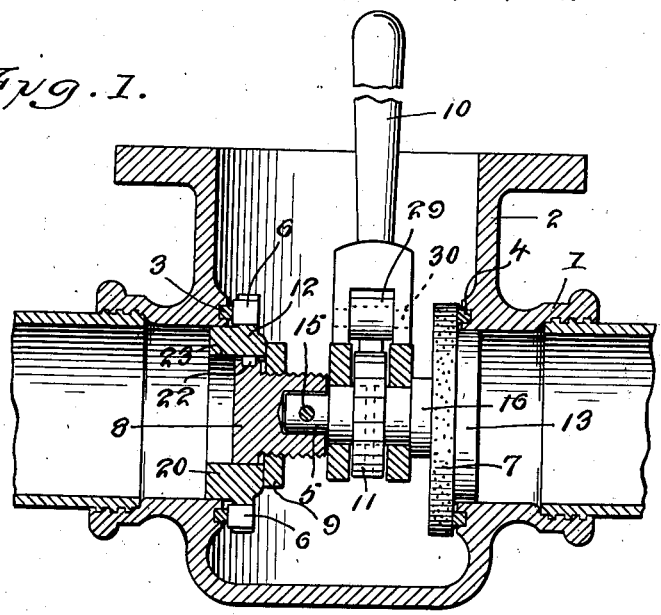
Figure 2:
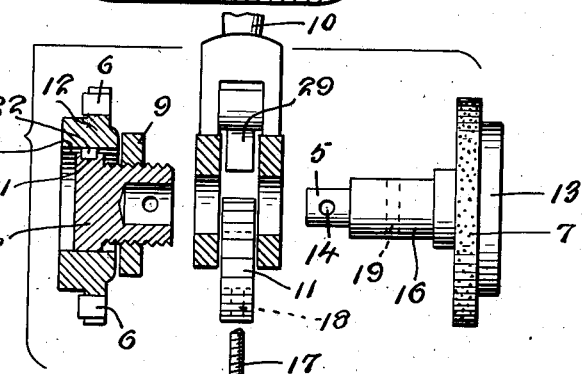
Figure 3:
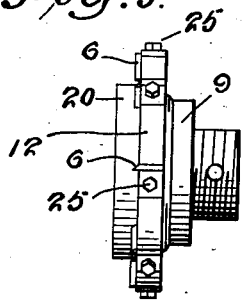
Figure 3 is a side view of the cutting tool which comprises a part of the invention.
Figure 4:
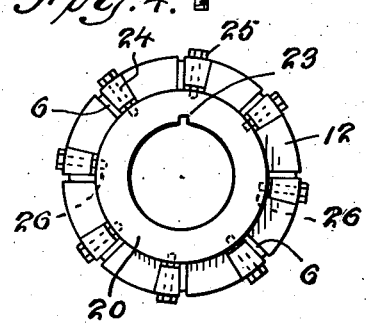
Figure 4 is a plan view of the knife carrier 12 which is a part of said cutting tool.
Figure 5:
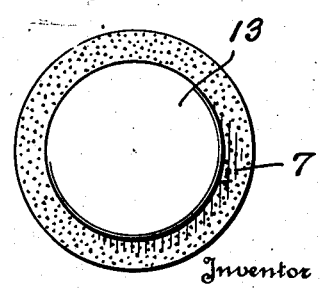
Figure 5 is a front plan view of the abrading tool element which comprises a part of the complete tool.

Now when, due to the corrosive action of steam or for any other reason, the valve seat or other surface needs scraping and grinding, this may be accomplished according to my invention by simply removing the valve proper and inserting the abrading machine. When in working position as shown in the accompanying drawing, the abrading device may be operated by means of the hand lever 15 attached to ratchet wheel 11. It will be readily apparent to those skilled in the art of valve grinders that one of the outstanding features of the present invention is the fact that both an abrading member and cutting members may be operated simultaneously.

Instead of the aforementioned knives or grinding disks, other suitable tools such as file blades or grindstones or the like may be used.

And instead of manually operating the abrading device, a motor may be used for this purpose.

It should be clearly understood that the foregoing description is merely by way of illustration and is in no wise to be considered as in any way limiting upon the structure or operation of my novel device. Doubtless numerous modifications may be made by one skilled in the art without departing from the spirit of the invention.

What I claim is:

1. A valve grinder comprising a cutting tool and an abrading tool, a spindle disposed between said tools and connecting the same to form a unitary device, means for centering said tools with respect to surfaces to be operated upon by said tools and means for rotating said tools.

2. A valve grinder comprising in combination a spindle, a cutting tool and an abrading tool respectively disposed at opposite ends of said spindle and rotatable therewith, the said tools being positioned in said spindle so as to be adapted to contact opposite parallel surfaces, means for adjusting laterally the distance between said tools, and means for rotating said spindle.

KURT KARNATH.